(12) United States Patent
Tang

(10) Patent No.: US 7,447,155 B2
(45) Date of Patent: Nov. 4, 2008

(54) GUARANTEED SERVICE IN A DATA NETWORK

(75) Inventor: Puqi Perry Tang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1225 days.

(21) Appl. No.: 10/173,909

(22) Filed: Jun. 17, 2002

(65) Prior Publication Data

US 2003/0231648 A1 Dec. 18, 2003

(51) Int. Cl.
*G01R 31/08* (2006.01)

(52) U.S. Cl. ............ 370/235; 370/235.1; 370/395.21

(58) Field of Classification Search ......... 370/230–238, 370/412, 252
See application file for complete search history.

(56) References Cited

U.S. PATENT DOCUMENTS

| | | | | |
|---|---|---|---|---|
| 5,289,462 A | * | 2/1994 | Ahmadi et al. ............... | 370/232 |
| 5,408,465 A | | 4/1995 | Gusella et al. | |
| 5,831,971 A | | 11/1998 | Bonomi et al. | |
| 6,112,241 A | * | 8/2000 | Abdelnour et al. ........... | 709/224 |
| 6,147,970 A | | 11/2000 | Troxel | |
| 6,373,824 B1 | * | 4/2002 | Tang et al. ................... | 370/252 |
| 6,449,255 B1 | * | 9/2002 | Waclawsky ................. | 370/236 |
| 6,690,647 B1 | * | 2/2004 | Tang et al. ................... | 370/235 |
| 6,771,646 B1 | * | 8/2004 | Sarkissian et al. ........... | 370/392 |
| 6,826,150 B1 | * | 11/2004 | Bhattacharya et al. ....... | 370/230 |
| 6,868,062 B1 | * | 3/2005 | Yadav et al. ................. | 370/234 |
| 6,870,812 B1 | | 3/2005 | Kloth et al. | |
| 6,901,050 B1 | | 5/2005 | Acharya | |
| 6,904,014 B1 | | 6/2005 | Gai et al. | |
| 6,904,020 B1 | * | 6/2005 | Love et al. ................... | 370/252 |
| 6,925,055 B1 | | 8/2005 | Erimli et al. | |
| 6,958,977 B1 | * | 10/2005 | Mitrani et al. ............... | 370/252 |
| 6,965,566 B2 | | 11/2005 | Kawasaki et al. | |
| 7,061,864 B2 | | 6/2006 | Van Everdingen | |

(Continued)

FOREIGN PATENT DOCUMENTS

WO PCT/US03/18308 10/2003

OTHER PUBLICATIONS

Puqi Perry Tang et al., "Network Traffic Characterization Using Token Bucket Model", IEEE 1999, pp. 51-62.

(Continued)

*Primary Examiner*—Phirin Sam
(74) *Attorney, Agent, or Firm*—Blakely, Sokoloff, Taylor & Zafman LLP (57) ABSTRACT

According to an embodiment of the invention, a data controller comprises a traffic pattern collector to observe a data traffic pattern, the data traffic being comprised of data packets; a traffic service engine to receive data from the traffic controller concerning the data traffic pattern and to determine a data flow specification for the data traffic pattern, the received data including the size and arrival time of each of the data packets; and a quality of service provider to receive the data flow specification. The data flow specification is the minimum data flow specification data flow specification that will allow each of the data packets to be transferred by the traffic controller within a delay upper bound. According to one embodiment, the minimum data flow specification for the data traffic pattern is determined according to an algorithm known as the Any-Delay TB Algorithm.

8 Claims, 4 Drawing Sheets

Traffic Specification Technology

U.S. PATENT DOCUMENTS

| | | |
|---|---|---|
| 7,120,158 B2 | 10/2006 | Kyusojin |
| 7,130,272 B1 | 10/2006 | Gai et al. |
| 7,130,917 B2 | 10/2006 | Zhang et al. |
| 2005/0265321 A1* | 12/2005 | Rappaport et al. .......... 370/352 |

OTHER PUBLICATIONS

Guffens et al Oct. 28, 2002—Using Token Leaky Bucket With Feedback Control For Guaranteed Boundedness Of Buffer Queue—7 pages.

Ciuci et al—The Partially Stopped Leaky Bucket: An Efficient Traffic Regulator With Constant Time Implementation—8 pages.

"42P14129CN OA Mailed Oct. 19, 2007 for CN Patent Application 03814191.4", (Oct. 19, 2007), Whole Document.

Ciucu et al—The Partially Stopped Leaky Bucket: An Efficient Traffic Regulator With Constant Time Implementation—8 pages, 2002.

\* cited by examiner

Figure 1    Token Bucket Operation

Figure 2    Traffic Specification Technology

Figure 3 — Exemplary Network Architecture

Figure 4

Determination of Optimal Token Bucket Size

GUARANTEED SERVICE IN A DATA NETWORK

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright © 2002, Intel Corporation, All Rights Reserved.

FIELD

An embodiment of the invention relates to data networks in general, and more specifically to guaranteed service in a data network.

BACKGROUND

In a data network, quality of service (QoS) refers to the service provided for network traffic. A particular type of quality of service is "guaranteed service" in which the end-to-end delay for data transmission is guaranteed to be no more than a certain delay bound or limit. Guaranteed service is particularly important in services involving mission critical communications, including voice over Internet technology (voice over IP or VoIP), in which an Internet connection is used to transport voice data, and virtual private networking (VPN), in which the Internet or another public communication medium is used for transport of private network data.

In order to guarantee an end-to-end delay bound for data traffic on a data path, each node along the data path must guarantee a delay bound and the sum of the per node delay bounds is limited to the end-to-end delay bound. One data traffic capacity system that may be instituted in a node of a network is a token bucket. However, in order to utilize a traffic capacity system such as a token bucket model in a network and ensure that a delay bound is met, minimum parameters need to be established for the traffic capacity system. The required minimum parameters that will enable the system to remain within the delay upper bound are dependent upon the data traffic pattern that is encountered. In conventional network traffic systems, there is no efficient and effective mechanism for determining the minimum parameters that are required in order to meet guaranteed service requirements for a particular data traffic pattern.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for guaranteed service in a data network.

In the following description, for the purposes of explanation, numerous specific details are set forth. However, it is understood that embodiments of the invention may be practiced without these specific details. In other instances, well-known circuits, structures, techniques, and devices have not been shown in detail.

Embodiments of the invention include various processes, which will be described below. The processes may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Terminology

Before describing an exemplary environment in which various embodiments of the present invention may be implemented, some terms that will be used throughout this application will briefly be defined:

As used herein, "quality of service" or "QoS" means the quality of service provided for network data traffic.

As used herein, "guaranteed service" means a quality of service that guarantees that the end-to-end delay for a data flow does not exceed an upper bound.

According to an embodiment of the invention, a data traffic pattern is transmitted in a network, with the network traffic being comprised of data packets. According to an embodiment of the invention, the network includes a traffic control system to control the data traffic flow. According to an embodiment of the invention, the network utilizes a token bucket controller model in a traffic control system. According to an embodiment of the invention, an upper bound is prescribed for delay of the data traffic and, utilizing information regarding a traffic pattern, a parameter for the traffic control system is determined such that no delay of a data packet exceeds the upper bound. Under a particular embodiment, the determined parameter is the size of a token bucket. According to an embodiment of the invention, the determined parameter is the minimum parameter that ensures operations complying with the delay upper bound.

Under an embodiment of the invention, a traffic pattern collector collects raw traffic patterns from a network data flow and passes information regarding the traffic patterns to a measurement-based traffic specification (MBTS) engine. According to the embodiment, the engine converts the raw traffic pattern data into flow specifications and provides the flow specifications to a QoS service provider. The flow specifications are used in the specification of data traffic control.

Under an embodiment of the invention, the processing of traffic patterns is accomplished on a real-time basis. The utilization of real-time processing for data traffic control makes the efficiency of the processing algorithm extremely important in maintaining efficient network operation.

Under an embodiment of the invention, a token bucket controller is used for purposes of traffic control. Token bucket data controllers, which may be utilized in traffic shapers, switches, routers, and other networking devices, allow for limited delay for data packets. According to an embodiment, delayed data packets are temporarily cached in a queue associated with the token bucket controller. For a given traffic pattern and a prescribed delay upper bound, token bucket parameters are established to ensure that no delay of a data packet exceeds the upper bound. In particular, a token bucket size parameter is determined that is the minimum size that can guarantee that the delay upper bound is not violated.

Figure 1:
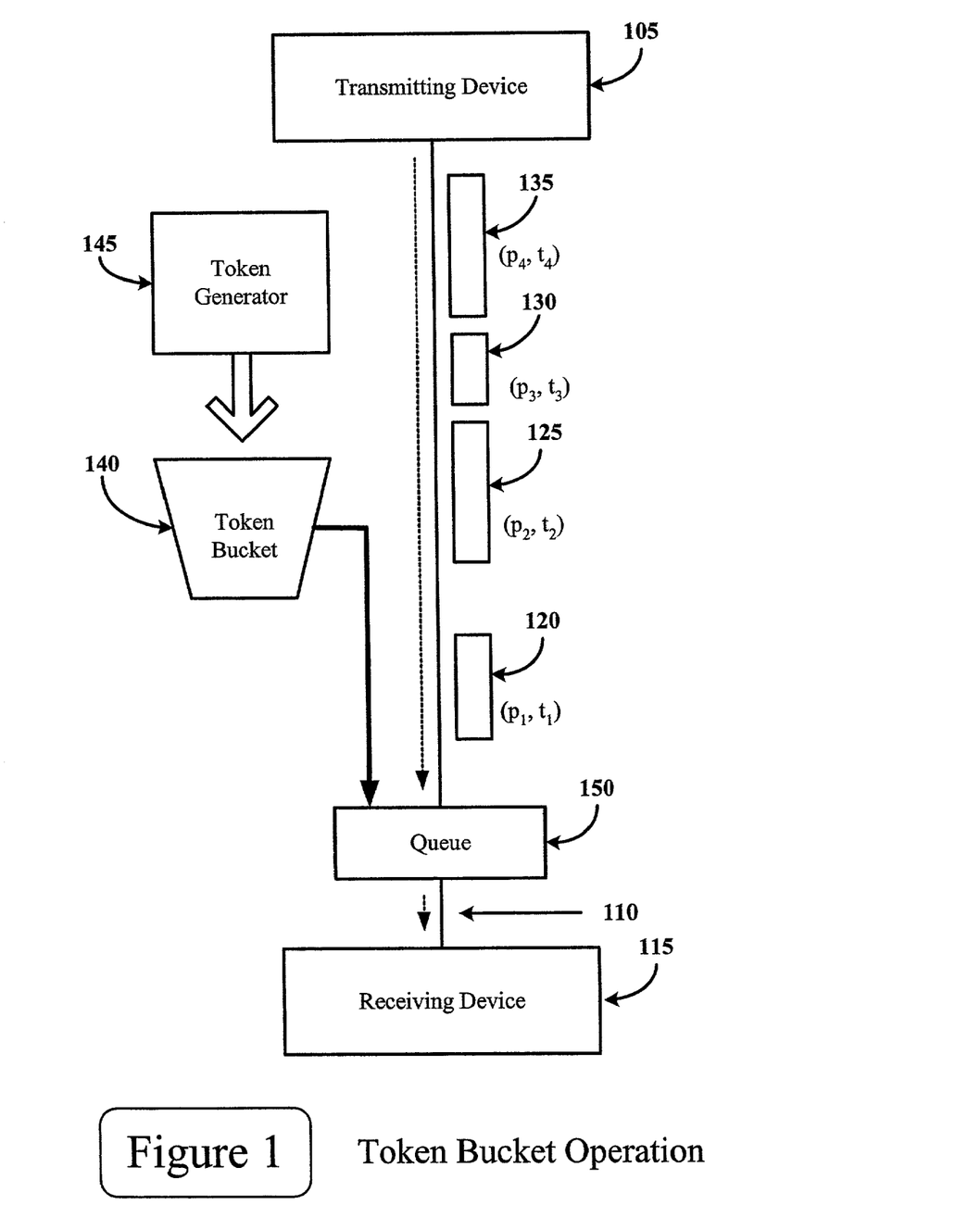
FIG. 1 is an illustration of token bucket operation under an embodiment of the invention.

FIG. 1 illustrates a token bucket model that may be utilized in connection with an embodiment of the invention. In this illustration, a transmitting device 105 is transmitting data to a receiving device 115 over a communication path 110. The transmitting device 105 and receiving device 115 may be any device or system in a computer network, including any network server, switch, router, client system, or other device or system. The data is transmitted in the form of data packets, with the data packets being of varying sizes and arriving at various times. The data packets shown in FIG. 1 are a first data packet 120 of size $p_1$ and arriving at time $t_1$, a second data packet 125 of size $p_2$ and arriving at time $t_2$, a third data packet 130 of size $p_3$ and arriving at time $t_3$, and a fourth data packet 135 of size $p_4$ and arriving at time $t_4$.

As shown in FIG. 1, the variance in the size and arrival time of the data packets results in certain time periods with little activity and certain time periods with "bursts" of data. The data packets are processed through a flow controller utilizing a scheduling counter, which may be illustrated symbolically as a token bucket 140. In this illustration, the token bucket 140 receives tokens periodically from a token generator 145. The token bucket controller regulates the flow of data. The token bucket controller allows certain bursts of data, such as represented in FIG. 1 by the second data packet 125, the third data packet 130, and the fourth data packet 135 arriving in close sequence, but the system limits how large the bursts of data traffic can be. The level of data flow is regulated by the tokens. For each particular number of bytes released to the network, one token is used and removed from token bucket 140. Under a particular embodiment, one token is required for each byte of data that is released. A token generation rate r represents the number of tokens that are generated per unit of time. The token bucket 140 can hold a certain maximum number of tokens b, the token bucket capacity.

According to the illustration shown in FIG. 1, a data packet that has arrived will be released when there are sufficient tokens in the token bucket for the number of bytes contained in the data packet. If there are not sufficient tokens available at a particular time to release a data packet, the data packet is held, or stored in a queue 150, until token generator 145 generates sufficient tokens for token bucket 140 to allow transmission. Under a particular embodiment, the token bucket 140 includes parameters (r, b), where r is the token bucket rate and b is the token bucket size. Under an embodiment of the invention, the queue 150 that is utilized for a token bucket is sufficiently large to hold any backlogged data packets. The traffic pattern that is observed will have a certain maximum size of a data packet, which may be denoted as m.

Under an embodiment of the invention, token generator 145 and token bucket 140 comprise a counter that increments at a constant rate r with a maximum count of b. The counter is decremented for each data packet that is released, with, for example, the count being reduced by one for each byte that is released. If the counter is not at a sufficient count for the release of a data packet, the data packet is held in queue 150 until the counter reaches a sufficient count. However, holding a data packet in queue 150 creates a delay for the data. If there is an upper bound prescribed for data delay, there is a question regarding the minimum size required for the token bucket in order to ensure guaranteed service in which the delay upper bound is not exceeded for any data packet.

Figure 2:
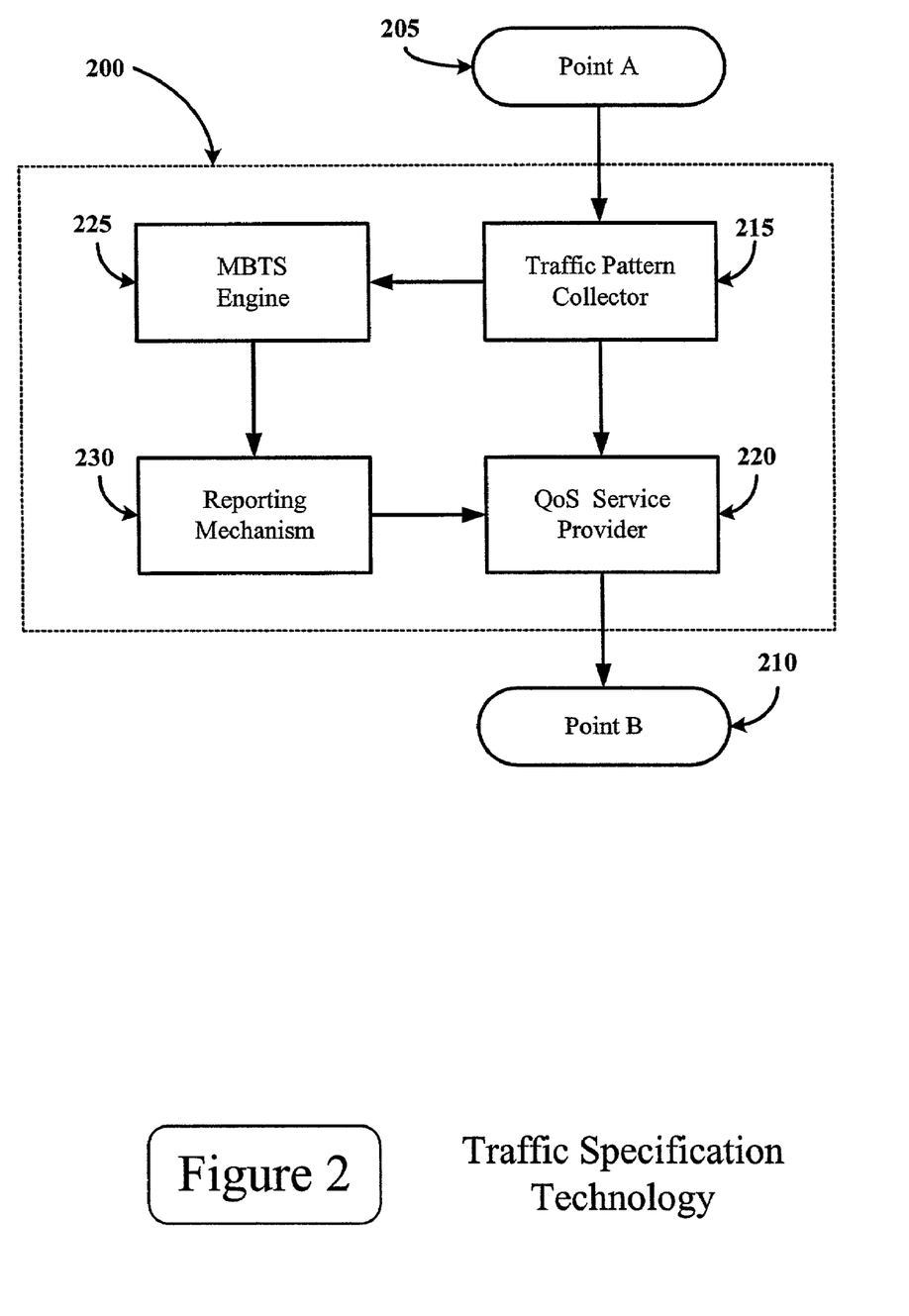
FIG. 2 is an illustration of traffic specification technology under an embodiment of the invention.

FIG. 2 is a block diagram illustrating the operation of a measurement-based traffic specification system 200 under an embodiment of the invention. The system 200 may exist for any observation point in a network. In this illustration, data in the form of data packets is transferred from the preceding point in the network, designated as Point A 205, to the next point in the network, designated as Point B 210. The data traffic will flow through traffic pattern collector 215 and QoS provider 220 on to the second point 210. The traffic pattern collector 215 collects information regarding the traffic pattern and provides the information to a measurement-based traffic specification (MBTS) engine 225. The information may include the number of data packets received, the size of each data packet, and the time at which each data packet arrived at the traffic pattern collector 215.

The MBTS engine 225 converts the raw information regarding the data pattern to data flow specifications. Under an embodiment of the invention, the flow specifications determined by the MBTS engine 225 are in the form of optimal token bucket parameters for the data traffic pattern. The results determined by the MBTS engine 225 are then made available to the QoS service provider 220 through a reporting mechanism 230. Note that in this description, in order to facilitate explanation, the traffic pattern collector 215, the QoS service provider 220, the MBTS engine 225, and the reporting mechanism 230 are generally discussed as if each is a single functional unit. However, the functions performed by these various elements may be consolidated and/or distributed differently than as described. For example, any function can be implemented on any number of logical or physical devices or on a single logical or physical device.

Figure 3:
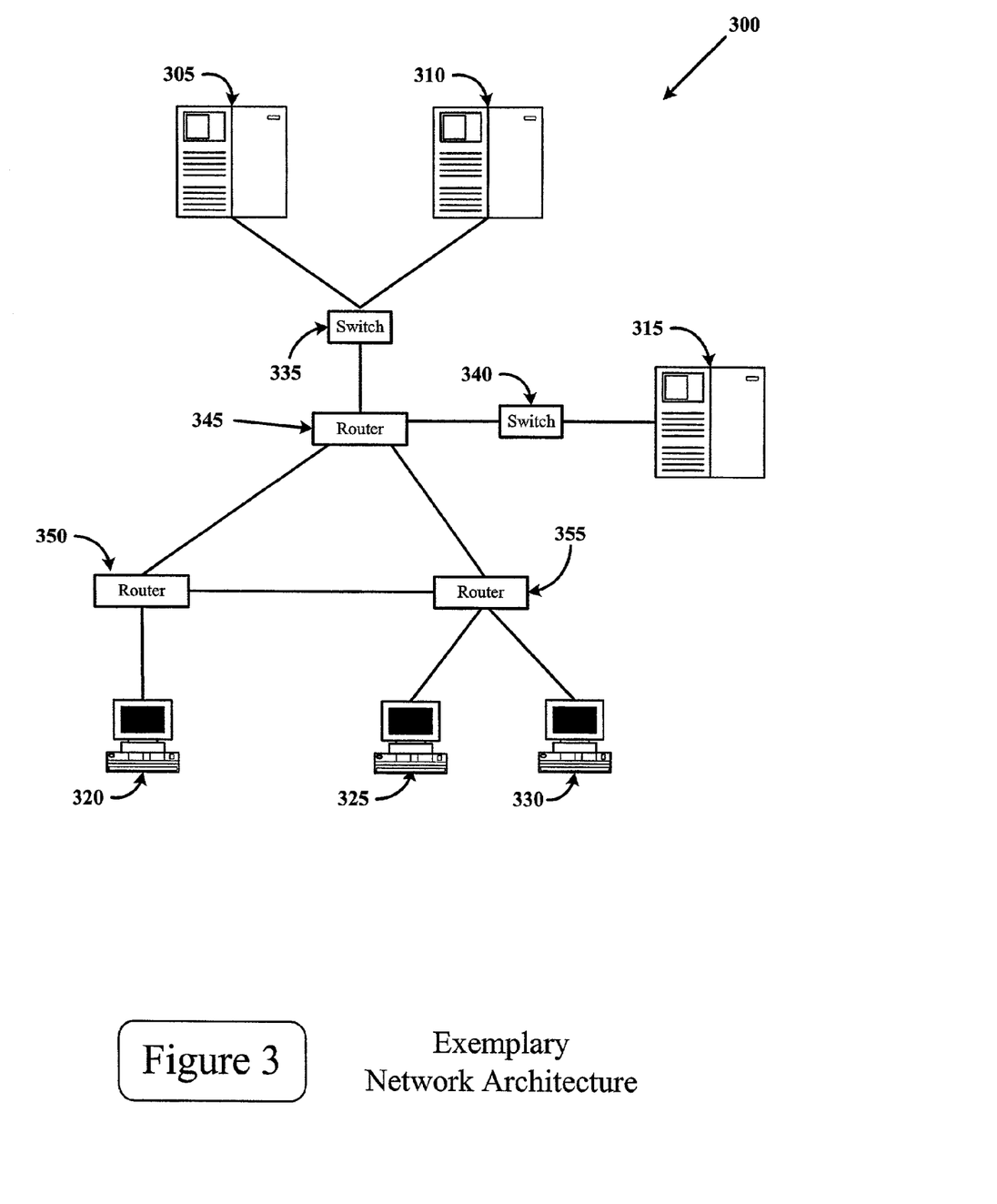
FIG. 3 is an illustration of an exemplary network architecture in which an embodiment of the invention may be utilized.

FIG. 3 is a block diagram of a exemplary network architecture that may include an embodiment of the invention. FIG. 3 is intended as a simplified example, but the embodiments of the inventions may be implemented in many different environments. In FIG. 3, a network 300 is illustrated, which may include one or more servers. In this example, the network 300 is shown to include a first server 305, a second server 310, and a third server 315. The network may include one or more clients, shown in FIG. 3 as a first client 320, a second client 325, and a third client 330. In this illustration, the network devices are connected by switches 335 and 340 and by routers 345, 350, and 355. In one example, the first client 320 may request certain data. In this example, the data requested may be supplied by multiple sources, including the first server 305 and the second server 310. With data traffic control under an embodiment of the invention, data traffic in the network may be measured at any point in the network. According to an embodiment of the invention, switch 335 may sense the data traffic associated with the first server 305 and the second server 310. In particular, the amount of traffic at any time may be determined, including whether there are bursts of high traffic levels. Using the traffic data information, the data loads on the first server 305 and the second server 310 may be adjusted or balanced as necessary to, for example, insure that data traffic does not exceed an upper bound prescribed for data delay.

According to an embodiment of the invention, the third server 315 may be subject to a profile when supplying data to the network, the profile including limitations on the rate of data transmission and the "burstiness" of the data traffic from the server. An observation point may be implemented at switch 340 to determine the traffic pattern characteristics. Under an embodiment of the invention, a data controller may control the traffic to insure that the required profile is maintained while insuring that guaranteed service is provided such that no data is delayed more than a certain upper bound.

Under an embodiment of the invention, a token bucket is utilized in a data controller for a traffic flow of data packets, the token bucket having a rate that is at least equal to the average data traffic flow. The traffic flow is comprised of n data packets. Each data packet in the traffic flow has a particular size and arrives at a particular time. To determine a size for a token bucket that will ensure that the delay of any data packet in the traffic is no more than a prescribed upper bound, certain calculations are performed for each data packet from 1 to n. Under an embodiment of the invention, the calculations are performed in real time as data packets are observed. The result of such calculations is a size parameter for the token bucket, the size parameter being the minimum token bucket size that will meet the delay upper bound requirement.

Under an embodiment of the invention, the size parameter for a token bucket for a given delay upper bound is calculated pursuant to an algorithm that may be denoted as the "Any-Delay TB Algorithm", where TB indicates a token bucket. Under an embodiment of the invention, the size parameter for the token bucket may be determined as follows:

Token bucket rate=r, where the rate is at least equal to the average data rate for the data flow
D=delay upper bound
b, d, and m are integer variables, where:
    b=a placeholder for a token bucket size
    d=an intermediate value
    m=an intermediate value that will become the maximum packet size for a given traffic pattern A data traffic pattern comprised of data packets may be described as:

$(p_1,t_1), (p_2,t_2), \ldots, (p_n,t_n)$ which indicates a data flow with n data packets, where the i-th data packet has a size of $p_i$ bytes and arrives at a time $t_i$. Utilizing this terminology, the relation of the token bucket rate to the average data rate may be expressed as follows:

$$r \geq \frac{\sum_{i=1}^{n} p_i}{(t_n - t_1)}$$

Under an embodiment of the invention, for a given traffic pattern comprised of data packets, a token bucket size may be determined as follows, as expressed in pseudo-code:

```
b = d = p_1 - r · D
m = p_1
For k = 2 to n
{
    d = max[d + p_k - r · (t_k -t_{k-1}), p_{k-1} + p_k - r · (t_k + D -t_{k-1}), p_k - r · D]
    b = max(b,d)
    m = max(p_k,m)
}
b = max(b,m)
```

Figure 4:
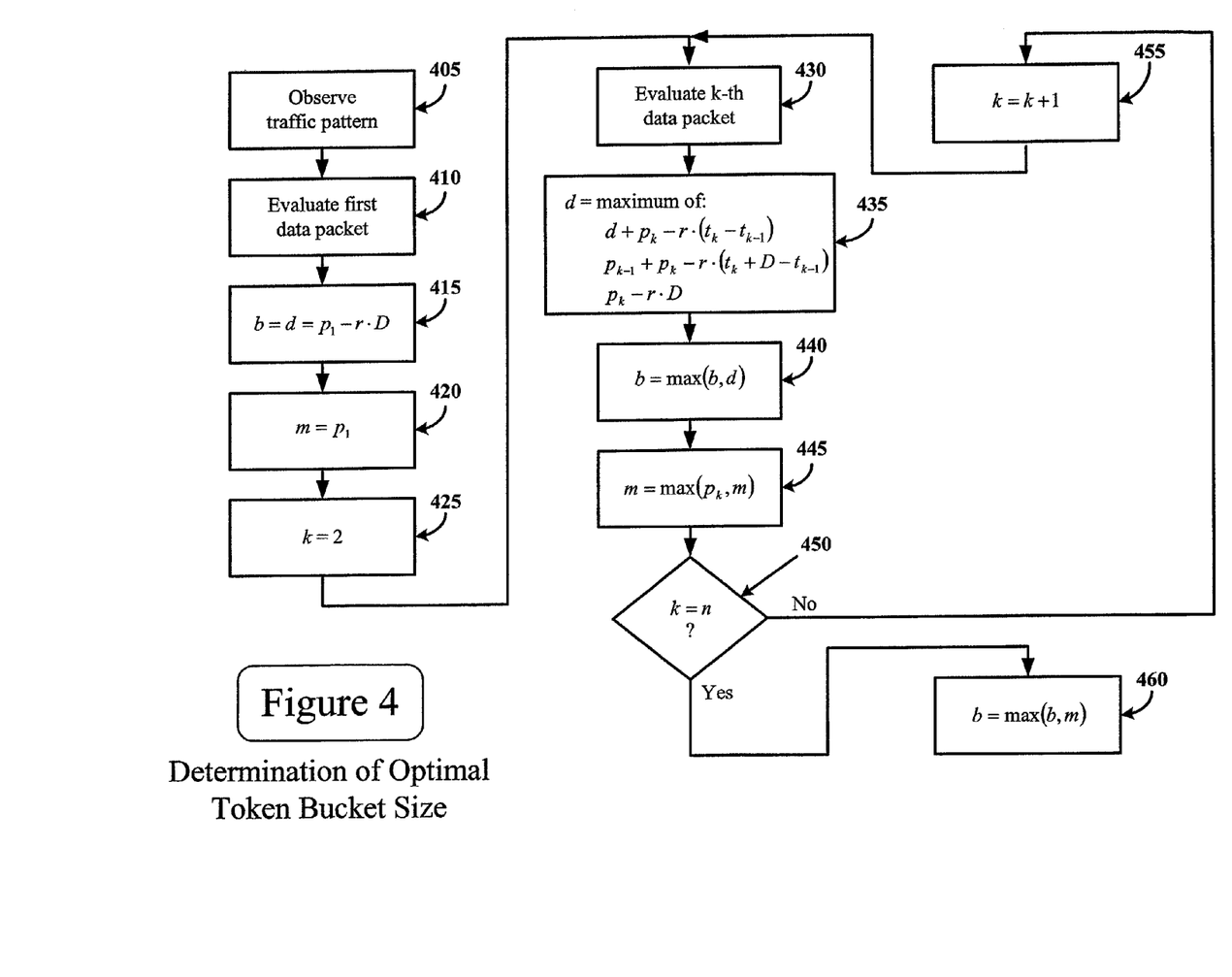
FIG. 4 is a flow chart illustrating the determination of an optimal token bucket size under an embodiment of the invention.

FIG. 4 illustrates the selection of the size parameter for a token bucket under an embodiment of the invention. According to an embodiment of the invention, a traffic pattern comprised of data packets is observed, process block 405. The first data packet is evaluated, process block 410. A first variable b and a second variable d are initially set at the size of the first data packet minus the rate of the token bucket times the delay upper bound D, process block 415. A third variable m, which ultimately will be equal to the maximum packet size in the traffic stream, is initially set at the size of the first data packet, process block 420.

According to an embodiment of the invention, a series of calculations (or loop) is performed for data packets 2 through n. Beginning with the second data packet, process block 425, each such data packet is evaluated, process block 430. For each of such data packets, the variable d is set to the maximum of three numbers, process block 435. The first number is equal to the previous value of variable d plus the size of the current data packet minus the rate of the token bucket times the difference between the time of the current data packet and the time of the preceding data packet. The second number is equal to the size of the preceding data packet, plus the size of the current data packet, minus the rate of the token bucket times a number equal to the time of the current data packet plus the delay upper bound D minus the time of the last data packet. The third number is equal to the size of the current packet minus the rate of the token bucket times the delay upper bound D.

The variable b is set to the maximum of either the previous value of the variable b or the current value of the variable d, process block 440. The variable m is set to the maximum of either the size of the current data packet or the previous value of the variable m, process block 445. As m is set to the maximum of either the current data packet size or the previous maximum size, m will equal the size of the largest data packet after all data packets have been evaluated.

If there are additional data packets to evaluate, process block 450, the next data packet is chosen, process block 455. After the series of calculations are performed for each of the data packets, process block 450, the token bucket size parameter b is the maximum of either the previous value of the variable b or the current value of the variable m, process block 460. Under an embodiment of the invention, the value of b determined expresses the minimum token bucket size that will satisfy the delay upper bound condition.

Under an embodiment of the invention, the loop in the algorithm for calculation of the token bucket size parameter operates only n−1 times. For this reason, the complexity of the algorithm in time is O(n), which indicates that the complexity of computation is linearly related to the number of data packets in the traffic pattern. Under an embodiment of the invention, the space required for computation of the token bucket size parameter is comprised of only the three integer variables d, b, and m. Therefore, in space the complexity of the algorithm is O(1), which indicates that the memory required for computation is constant. The linear complexity of computation and the constant memory requirements indicate that the computations utilized to establish the token bucket size are extremely efficient and light weighted and thus have a minimal impact on system operation.

Appendix

Additional details regarding the Any-Delay TB Algorithm described above are provided in Appendix A.

The invention has been described in terms of several embodiments. However, those skilled in the art will recognize that the invention is not limited to the embodiments described, but rather that modifications and changes may be made without departing from the broader spirit and scope of the invention. The specification and drawings are thus to be regarded as illustrative rather than limiting.

What is claimed is:

1. A data controller comprising:
a traffic pattern collector to observe a data traffic pattern, the data traffic being comprised of a plurality of data packets;
a traffic service engine to receive data from the traffic pattern collector concerning the data traffic pattern and to determine a data flow specification for the data traffic pattern, the data flow specification comprising a token bucket size, the received data including the size and arrival time of each of the data packets, wherein the token bucket size is based at least in part on the sizes and arrival times of the data packets, and wherein the data controller considers each data packet only once in the determination of the token bucket size; and
a quality of service provider to receive the data flow specification;
wherein the traffic service engine is to determine the data flow specification by:
for a first data packet of the plurality of data packets, setting a first variable and a second variable to be a first packet size minus the product of a token bucket rate times a delay upper bound, and setting a third variable at the first packet size,
for each subsequent data packet of the plurality of data packets:
setting the second variable at a maximum of:
the previous value of the second variable plus a current data packet size minus the token bucket rate times a difference between a time of the current data packet and a time of the preceding data packet,
the preceding data packet size plus the current data packet size, minus the token bucket rate times a number equal to the time of the current data packet plus the delay upper bound minus the time of the last data packet, or
the current packet size minus the token bucket rate times the delay upper bound,
setting the first variable to a maximum of the previous value of the first variable or the current value of the second variable, and setting the third variable to a maximum of the current data packet size or the previous value of the third variable;
after all of the plurality of data packets have been considered, setting the data flow specification to the maximum of the previous value of the first variable or the previous value of the third variable.

2. The data controller of claim 1, further comprising a reporting mechanism to report the data flow specification to the quality of service provider.

3. A method comprising:
observing a data traffic pattern of a computer network, the data traffic pattern being comprised of a stream of data packets;
determining information regarding the data traffic pattern, the information including the size of each of the data packets and the time of arrival of each of the data packets;
determining a traffic control parameter value for the computer network based upon the information regarding the data traffic pattern, the traffic control parameter comprising a token bucket size, wherein the token bucket size is based at least in part on the sizes and arrival times of the data packets, and wherein the data controller considers each data packet only once in the determination of the token bucket size;
setting a token bucket size of a data traffic controller associated with the network device to the determined token bucket size; and
controlling data traffic using the data traffic controller;
wherein calculations to determine the token bucket size are performed as data packets are observed, the token bucket size being determined by:
for a first data packet, setting a first variable and a second variable to be a first packet size minus the product of a token bucket rate times a delay upper bound, and setting a third variable at the first packet size,
for each subsequent data packet:
setting the second variable at a maximum of:
the previous value of the second variable plus a current data packet size minus the token bucket rate times a difference between a time of the current data packet and a time of the preceding data packet,
the preceding data packet size plus the current data packet size, minus the token bucket rate times a number equal to the time of the current data packet plus the delay upper bound minus the time of the last data packet, or
the current packet size minus the token bucket rate times the delay upper bound,
setting the first variable to a maximum of the previous value of the first variable or the current value of the second variable, and setting the third variable to a maximum of the current data packet size or the previous value of the third variable;
when all of the data packets have been considered, setting the token bucket size to the maximum of the previous value of the first variable or the previous value of the third variable.

4. A computer-readable medium having stored thereon data representing sequences of instructions that, when executed by a processor, cause the processor to perform operations comprising:
observing a data traffic pattern of a computer network, the data traffic pattern being comprised of data packets;
determining information regarding the data traffic pattern, the information including the size of each of the data packets and the time of arrival of each of the data packets;
determining a traffic control parameter value for the computer network based upon the information regarding the data traffic pattern, the traffic control parameter comprising a token bucket size, wherein the token bucket size is based at least in part on the sizes and arrival times of the data packets, and wherein the data controller considers each data packet only once in the determination of the token bucket size;
setting a token bucket of a data traffic controller associated with the network device to the determined token bucket size; and
controlling data traffic using the data traffic controller;
wherein calculations to determine the token bucket size are performed on a real time basis, and where the token bucket size is determined by:

for a first data packet, setting a first variable and a second variable to be a first packet size minus the product of a token bucket rate times a delay upper bound, and setting a third variable at the first packet size, for each subsequent data packet:
setting the second variable at a maximum of:
the previous value of the second variable plus a current data packet size minus the token bucket rate times a difference between a time of the current data packet and a time of the preceding data packet,
the preceding data packet size plus the current data packet size, minus the token bucket rate times a number equal to the time of the current data packet plus the delay upper bound minus the time of the last data packet, or
the current packet size minus the token bucket rate times the delay upper bound,
setting the first variable to a maximum of the previous value of the first variable or the current value of the second variable, and setting the third variable to a maximum of the current data packet size or the previous value of the third variable;

when all of the data packets have been considered, setting the token bucket size to the maximum of the previous value of the first variable or the previous value of the third variable.

5. The medium of claim 4, wherein the complexity of the calculations to determine the token bucket size is linear in time and is fixed in space.

6. A method comprising:
observing a traffic pattern in a computer network comprising n data packets, the size and time of arrival of such data packets being $(p_1,t_1)$, $(p_2,t_2)$, . . . ,$(p_n,t_n)$, wherein n is an integer;
determining a size of a token bucket utilized in connection with a data traffic controller, wherein the rate of the token bucket is r and the delay upper bound is D, and wherein the determination of the token bucket size comprises:
for the first data packet, wherein k=1:
setting values for variable d and a variable b as follows:

$b=d=p_1-r \cdot D$, and setting a value for a variable m as follows:

$m=p_1$; and for each the second through n-th data packets, wherein k=2 through n, performing the following calculations:

$d=\max[d+p_k-r \cdot (t_k-t_{k-1}), p_{k-1}+p_k-r \cdot (t_k+D-t_{k-1}), p_k-r \cdot D]$ $b=\max(b,d)$, and $m=\max(p_k,m)$;

determining the token bucket size to be variable b calculated as:

$b=\max(b,m)$;

setting a token bucket size of the data traffic controller to the determined token bucket size; and
controlling data traffic using the data traffic controller.

7. A computer-readable medium having stored thereon data representing sequences of instructions that, when executed by a processor, cause the processor to perform operations comprising:

observing a traffic pattern of a computer network comprising n data packets, the size and time of arrival of such data packets being $(p_1,t_1)$, $(p_2,t_2)$, . . . ,$(p_n,t_n)$, wherein n is an integer;
determining a size of a token bucket utilized in connection with a data traffic controller, wherein the rate of the token bucket is r and the delay upper bound is D, and wherein the determination of the token bucket size comprises:
for the first data packet, wherein k=1:
setting values for variable d and a variable b as follows:

$b=d=p_1-r \cdot D$, and setting a value for a variable m as follows:

$m=p_1$; and for each the second through n-th data packets, wherein k=2 through n, performing the following calculations:

$d=\max[d+p_k-r \cdot (t_k-t_{k-1}), p_{k-1}+p_k-r \cdot (t_k+D-t_{k-1}), p_k-r \cdot D]$ $b=\max(b,d)$, and $m=\max(p_k,m)$;

determining the token bucket size to be variable b calculated as:

$b=\max(b,m)$ setting a token bucket size of the data traffic controller to the determined token bucket size; and
controlling data traffic using the data traffic controller.

8. A computer network comprising:
one or more servers;
a plurality of network devices, including a first network device; and
a token bucket data traffic controller sensing data traffic associated with the first network device, the traffic controller comprising:
a traffic pattern collector to observe data traffic associated with the first network device, the data being comprised of a plurality of data packets,
a traffic service engine to receive information from the traffic pattern collector concerning the data traffic and to determine a size for the token bucket, wherein the token bucket size is based at least in part on the sizes and arrival times of the data packets, and wherein the traffic service engine considers each data packet only once in determining the token bucket size
a quality of service provider to receive the determined token bucket size, and
a reporting mechanism to report the token bucket size to the quality of service provider;
wherein the traffic service engine is to determine the token bucket size by:
for a first data packet of the plurality of data packets, setting a first variable and a second variable to be a first packet size minus the product of a token bucket rate times a delay upper bound, and setting a third variable at the first packet size,
for each subsequent data packet of the plurality of data packets:
setting the second variable at a maximum of:
the previous value of the second variable plus a current data packet size minus the token bucket rate times a difference between a time of the current data packet and a time of the preceding data packet, the preceding data packet size plus the current data packet size, minus the token bucket rate times a number equal to the time of the current data packet plus the delay upper bound minus the time of the last data packet, or the current packet size minus the token bucket rate times the delay upper bound, setting the first variable to a maximum of the previous value of the first variable or the current value of the second variable, and setting the third variable to a maximum of the current data packet size or the previous value of the third variable;

after all of the data packets have been considered, setting the token bucket size to the maximum of the previous value of the first variable or the previous value of the third variable.

* * * * *